Patented Aug. 5, 1941

2,251,872

UNITED STATES PATENT OFFICE 2,251,872

ZINC OXIDE PIGMENT

David L. Gamble and James H. Haslam, Palmerton, Pa., assignors to The New Jersey Zinc Company, New York, N. Y., a corporation of New Jersey No Drawing. Application May 1, 1941,
Serial No. 391,409

6 Claims. (Cl. 106—296)

This invention relates to the manufacture of zinc oxide pigments in which the zinc oxide particles are surface-coated with a zinc phosphate. In our copending application for Letters Patent of the United States, Serial No. 266,410 filed April 6, 1939, we have described and claimed such zinc oxide pigments, and have pointed out that such pigments are characterized by reduced reactivity towards acidic constituents of paint vehicles and by a high resistance to metallic staining.

This application is a continuation in part of our copending application Serial No. 267,322 filed April 11, 1939. The present invention is particularly directed to pyrometallurgical methods of coating zinc oxide with phosphates for the production of zinc oxide pigments possessing substantially the same properties as the zinc oxide pigments described and claimed in our aforementioned application Serial No. 266,410. However, in accordance with the present invention, the surfaces of zinc oxide particles are caused to react with phosphoric acid anhydride, which may be derived from elemental phosphorus. Thus, the invention contemplates reacting dry and heated zinc oxide particles with phosphoric acid anhydride ($P_2O_5$) and thereby transforming the surface of a large part of the zinc oxide particles to a zinc phosphate and preferably to a zinc metaphosphate. The temperature of treatment should be such that phosphorus pentoxide has an appreciable vapor pressure. Depending upon the particular agent employed and the method of obtaining intimate contact of the zinc oxide particles therewith, the zinc oxide particles may be heated to a temperature of from 100° C. to about 900° C. or even higher. At higher temperatures, care should be taken to avoid or minimize particle size growth of the zinc oxide particles by limiting the time that such particles are exposed to the high temperature. Generally speaking, it is unnecessary to raise the temperature substantially above, say 400° C. for zinc oxide reacts satisfactorily with phosphorus pentoxide (phosphoric acid anhydride) at temperatures in the range of 100° C. to 340° C. Thus, when red phosphorus is employed as a source of the phosphorus pentoxide, the reaction proceeds satisfactorily at a temperature in the neighborhood of about 260° C.

The proportion of phosphorus pentoxide to employ will depend upon the particle size of the zinc oxide and also upon conditions prevailing during the reaction of the $P_2O_5$ with the zinc oxide. In general, the phosphorus pentoxide employed may range from 1% to 15% on the weight of the zinc oxide.

Treatment of the zinc oxide with phosphorus pentoxide per se preferably is carried out in a vacuum, i. e. at pressures substantially less than atmospheric. The presence of a small proportion of water vapor in the treatment atmosphere is desirable, especially when the zinc oxide is in suspension.

The invention will be best understood from the following illustrative examples of its practice. While the methods described in these examples are particularly effective in forming phosphate coatings upon zinc oxide, the invention may be practiced in other ways, and the examples are to be understood as illustrating the principles underlying the invention and in no way restrictive of its practical application.

*Example 1.*—Zinc oxide pigment is heated with phosphorus pentoxide (phosphoric acid anhydride) $P_2O_5$ at a temperature not high enough to cause substantial particle size growth of the zinc oxide particles but sufficiently high to cause the phosphorus pentoxide to have a substantial vapor pressure. A temperature of 340° C. is appropriate. When heated in this manner, the particles of zinc oxide pigment become coated with a zinc phosphate formed by the direct reaction of zinc oxide with phosphorus pentoxide.

The following procedures illustrate two ways of carrying out this method:

(a) zinc oxide pigment is reheated in a vacuum, or other appropriate non-reactive environment, with phosphorus pentoxide. Satisfactory results can be obtained with proportions of phosphorus pentoxide ranging from 3% to about 11% of the zinc oxide.

(b) Zinc oxide fume while in suspension is brought into contact with phosphorus pentoxide vapor. For example, phosphorus pentoxide in proportion ranging from about 1% to about 6% is introduced in a flue discharging zinc oxide fume from the combustion chamber of a zinc oxide furnace. It is preferable in this method for the zinc oxide fume to be relatively cool (e. g., at a temperature of 100–200° C.); and the presence of water vapor is desirable.

*Example 2.*—Zinc oxide is reheated with red phosphorus in an oxidizing atmosphere such as air, at a temperature at which the vapor pressure of phosphorus pentoxide is appreciable. An appropriate temperature in this case is 260° C. Under such conditions $P_2O_5$ vapor is formed by oxidation of the red phosphorus. The temperature should, as in Example 1, be sufficiently low so as not to cause appreciable particle size growth of the zinc oxide particles. This example may be considered a variant of Example 1.

In the following table a comparison is made of the reactivities of zinc oxides phosphated by reaction with phosphorus pentoxide with (1) the reactivity of a zinc oxide wet-treated with metaphosphoric acid and having a relatively high degree of nonreactivity, and (2) the reactivity of normal untreated zinc oxide. The reactivity numbers appearing in the table are a measure of the reactivity of the several zinc oxides with the acidic constituents of oleoresinous vehicles, and were obtained as follows:

The sample of zinc oxide pigment is suspended in a solution of linseed fatty acids in alcohol of known concentration. The pigment is allowed to stand in contact with this solution for 1½ hours and the concentration of fatty acid remaining in solution with the alcohol is determined after this time interval. If the zinc oxide is reactive, the concentration of fatty acid in solution will be reduced by virtue of the reaction of the zinc oxide and the fatty acid to form insoluble soap. The changes in concentration are determined by index of refraction methods. The reactivity is expressed in terms of the per cent of original concentration of fatty acids remaining after 1½ hours' contact with the pigment. The greater the reactivity number expressed in this way the less reactive is the zinc oxide.

| | Description of zinc oxide sample | Reactivity number. Percent of original concentration of fatty acids remaining after 1½ hours' contact with pigment |
|---|---|---|
| 1 | Zinc oxide reheated in vacuum with 6% $P_2O_5$ at 350° C | 97.5 |
| 2 | Zinc oxide reheated to about 700° C. in air with red phosphorus; 1% $P_2O_5$ thus incorporated in the zinc oxide | 91.0 |
| 3 | Wet treatment of zinc oxide with 3% metaphosphoric acid | 99.0 |
| 4 | Normal untreated zinc oxide | 35 |

A zinc oxide pigment having its particles surface-coated with a zinc phosphate in accordance with the pyrometallurgical methods of the invention possesses substantially the same desirable properties of reduced reactivity towards acidic constituents of paint vehicles and high resistance to metallic staining as do the zinc oxide pigments whose particles are similarly coated with a zinc phosphate by wet methods. As compared with wet methods of coating zinc oxide particles with zinc phosphate, the methods of the invention avoid the handling of large quantities of solutions or slurries, and the consequent use of mixing, filtering and drying equipment is either entirely eliminated or greatly restricted.

We claim:

1. In the manufacture of a zinc oxide pigment, the improvement which comprises heating the zinc oxide while the surfaces of its particles are in contact with phosphorus pentoxide, having a substantial vapor pressure and thereby imparting a zinc phosphate coating to the zinc particles.

2. In the manufacture of a zinc oxide pigment, the improvement which comprises introducing into the combustion chamber of a zinc oxide furnace phosphorus pentoxide, and reacting the phosphorus pentoxide thus introduced at a temperature such that the phosphorus pentoxide has a substantial vapor pressure with the zinc oxide, thereby imparting a zinc phosphate coating to the surfaces of a large part of the zinc oxide particles.

3. In the manufacture of a zinc oxide pigment, the improvement which comprises forming a surface coating of zinc phosphate on particles of zinc oxide by intimately contacting the particles in a dry and heated condition with phosphorus pentoxide under conditions such that the phosphorus pentoxide has a substantial vapor pressure.

4. Process according to claim 3 in which the zinc oxide particles and the phosphorus pentoxide are reacted with each other in the presence of water vapor.

5. Process according to claim 3 in which the phosphorus pentoxide is formed by burning elemental phosphorus in the presence of the zinc oxide particles.

6. Process according to claim 3 in which the zinc oxide and the phosphorus pentoxide are reacted together under vacuum.

DAVID L. GAMBLE.
JAMES H. HASLAM.